United States Patent
Reese

(10) Patent No.: US 10,611,128 B2
(45) Date of Patent: Apr. 7, 2020

(54) PROFILE PART AND METHOD FOR THE PRODUCTION OF A PROFILE PART

(71) Applicant: Daimler AG, Stuttgart (DE)

(72) Inventor: Eckhard Reese, Apensen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 15/537,201

(22) PCT Filed: Oct. 27, 2015

(86) PCT No.: PCT/EP2015/002087
§ 371 (c)(1),
(2) Date: Jun. 16, 2017

(87) PCT Pub. No.: WO2016/096061
PCT Pub. Date: Jun. 23, 2016

(65) Prior Publication Data
US 2017/0341349 A1    Nov. 30, 2017

(30) Foreign Application Priority Data

Dec. 19, 2014 (DE) .................. 10 2014 019 152

(51) Int. Cl.
  *B32B 27/08* (2006.01)
  *B32B 27/04* (2006.01)
  (Continued)

(52) U.S. Cl.
  CPC ............. *B32B 27/08* (2013.01); *B32B 1/08* (2013.01); *B32B 27/04* (2013.01);
  (Continued)

(58) Field of Classification Search
  CPC .......... B32B 1/08; B32B 27/04; B32B 27/08; B32B 2597/00; B32B 1/00; B32B 27/28; B32B 27/281; B32B 27/288; B32B 27/302; B32B 27/304; B32B 27/32; B32B 27/322; B32B 27/36; B32B 27/365; B32B 27/308; B32B 2307/7242; B32B 2262/0269; B32B 2262/00; B32B 2262/101;
  (Continued)

(56) References Cited

U.S. PATENT DOCUMENTS

| 2,815,043 | A | * | 12/1957 | Carmichael | B29C 53/56 138/144 |
| 5,957,164 | A |   | 9/1999 | Campbell | |
| 2014/0182735 | A1 | * | 7/2014 | Dyksterhouse | F16L 9/123 138/141 |

FOREIGN PATENT DOCUMENTS

| CN | 1314979 | * | 9/2001 |
| CN | 1314979 | A |   | 9/2001 |

(Continued)

OTHER PUBLICATIONS

Common Barrier Packaging Polymers—Their Functions & Applications, published Jun. 7, 2016.*

(Continued)

*Primary Examiner* — Camie S Thompson
(74) *Attorney, Agent, or Firm* — Crowell & Moring LLP

(57) ABSTRACT

A profile part is disclosed. The profile part has an inner profile formed as an extrusion profile and has at least one reinforcing layer made from fiber-reinforced plastic which is applied to the inner profile. The inner profile is formed from at least two layers.

5 Claims, 1 Drawing Sheet

(51) Int. Cl.
   *B32B 1/08* (2006.01)
   *B29C 48/09* (2019.01)
   *B29C 48/00* (2019.01)
   *B29C 48/88* (2019.01)

(52) U.S. Cl.
   CPC ...... *B29C 48/0021* (2019.02); *B29C 48/0022* (2019.02); *B29C 48/09* (2019.02); *B29C 48/9115* (2019.02); *B29C 2793/0027* (2013.01); *B32B 2307/7242* (2013.01)

(58) Field of Classification Search
   CPC .......... B32B 2262/106; B32B 2262/10; B32B 2262/0261; B32B 2262/103; B32B 2262/0276; B32B 2262/04; B32B 5/02; B32B 5/12; B32B 5/26; B32B 2260/046; B32B 2250/03; B29C 47/0023; B29C 47/0064; B29C 47/0066; B29C 48/9115; F16L 9/121; F16L 9/14; F16L 2011/047; Y10T 428/1393; Y10T 428/1386; B60J 5/042; B60J 5/0481; B29L 2023/22; B29L 2023/3002; B29K 2077/00; B29K 2309/08; Y10S 138/07; Y10S 273/07

USPC ........ 138/141, 126, 137, 140; 156/187, 195; 428/297.4, 36.91, 36.2, 36.8, 292.1; 296/146.6

See application file for complete search history.

(56) References Cited

FOREIGN PATENT DOCUMENTS

DE   10 2009 016 596 A1   10/2010
WO   WO 2013/075775 A2   5/2013

OTHER PUBLICATIONS

PCT/EP2015/002087, International Search Report dated Mar. 31, 2016 (Two (2) pages).
Chinese Office Action issued in Chinese counterpart application No. 201580068908.9 dated Jul. 2, 2018, with partial English translation (Ten (10) pages).

* cited by examiner

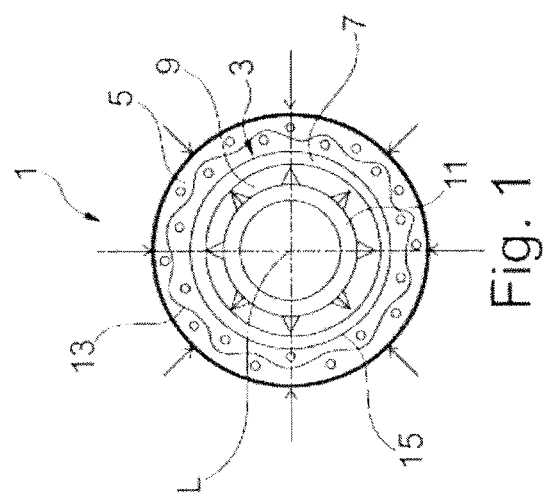
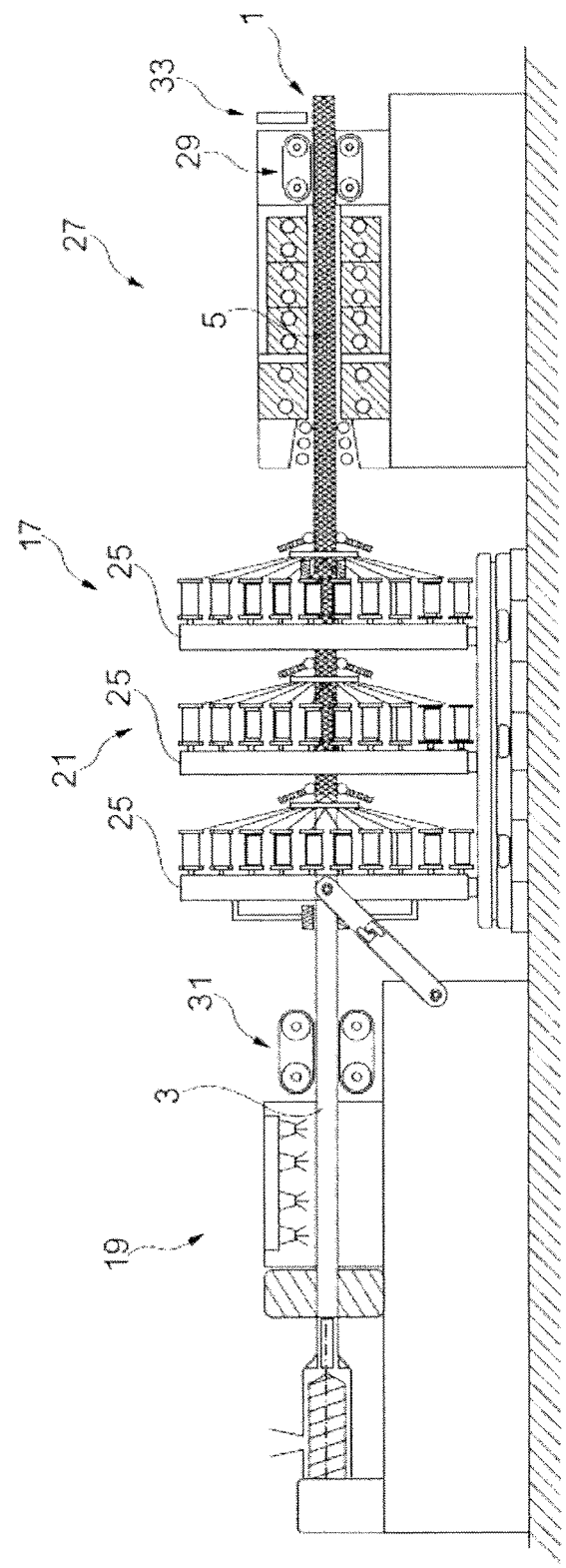

PROFILE PART AND METHOD FOR THE PRODUCTION OF A PROFILE PART

BACKGROUND AND SUMMARY OF THE INVENTION

The invention relates to a profile part and a method for the production of a profile part.

The German patent application DE 10 2009 016 596 A1 discloses a continuous profile and a method for its production, wherein the continuous profile has a reinforcing layer made from a profiled roving containing reinforcing fibers and a plastic layer surrounding the reinforcing layer. The continuous profile is produced by transferring the roving containing reinforcing fibers into a profiled shape and then coating it with a plastic layer by means of an extrusion process. It is thereby possible for the profiling of the roving to take place by applying it to a plastic extrusion profile. It is disadvantageous in this respect that a continuous profile produced in this way is not suitable for internal high-pressure forming in a subsequent method step because it does not have sufficient stability for the necessary internal pressure, wherein it also cannot readily be extrusion coated with an in particular thermoplastic material because it has too low a stability to absorb the injection pressure acting from the outside. In addition, the known production of the continuous profile is carried out in a multi-stage, discontinuous process, wherein the reinforcing layer is produced first of all, which is then subsequently provided in a separate step with the plastic layer surrounding it. In this case, in particular, air pockets can occur, which impair the stability and quality of the component produced.

The object of the invention is therefore to create a profile part and a method for its production, wherein the above-mentioned disadvantages do not occur.

The object is solved in particular by producing a profile part which has an inner profile formed as an extrusion profile and at least one reinforcing layer made from fiber-reinforced plastic, wherein the reinforcing layer is applied to the inner profile. In this case, it is provided that the inner profile is formed of at least two layers. Due to the multi-layered construction, it is easily possible to provide the inner profile with sufficient stability for an internal high-pressure forming process and/or an extrusion coating with an in particular thermoplastic material. In particular, it is possible in this case to adjust the layers functionally to a later use of the component and/or to subsequent production steps in order to obtain a high-quality profile part which is tailored to a specific application. Since the inner profile may already have a high, inherent stability and strength due to its multi-layered construction, it is not absolutely necessary to apply a further plastic layer to the reinforcing layer made from fiber-reinforced plastic. As a result, the profile part as a whole can be produced in an integrated, continuous process, wherein errors due to air pockets can be avoided and the quality of the profile part can be increased.

The inner profile formed as an extrusion profile is preferably tubular or formed as a hollow profile. In particular, it preferably has a cross section which is closed when seen in the circumferential direction. Here, different cross-sectional geometries are possible, in particular a circular cross section, an oval cross section, a square cross section, a polygonal cross section, or another suitable cross-sectional shape. The finished profile part preferably has a cross section which corresponds in terms of its geometry to the geometry of the cross section of the inner profile. However, it is also possible for the cross section of the profile part to be changed in the course of the production process from an original cross section of the inner profile. In any case, however, the profile part as a whole is preferably tubular or formed as a hollow profile, wherein, in particular, it has a cross section which is closed when seen in the circumferential direction, particularly preferably a circular cross section, an oval cross section, a square cross section, a polygonal cross section, or another, suitable cross-sectional geometry.

Circumferential direction here refers to a direction which extends concentrically to a longitudinal direction of the profile part. The longitudinal direction is preferably defined by the extrusion direction of the inner profile formed as an extrusion profile, i.e., the direction along which the inner profile is extruded. A radial direction is perpendicular to the longitudinal direction.

The inner profile is also preferably a component of the finished profile part, so it remains in this and is not removed again in the course of a downstream method step. In fact, the inner profile also provides the profile part with favorable properties in later end use, in particular an increased strength and rigidity.

The reinforcing layer preferably has long fibers, in particular plastic fibers, glass fibers, ceramic fibers, metal fibers, natural fibers, or other suitable fibers. In particular, it is possible for the reinforcing layer to comprise aramid fibers or basalt fibers. It is also possible for the reinforcing layer to be formed from fiber tapes.

The layers of the inner profile preferably have plastic, particularly preferably at least one thermoplastic. This is advantageous compared to the use of thermosets because thermosets cannot be recycled or at least are not readily recyclable, whereas thermoplastics can be recycled, in particular by means of mechanical processing, to form a high-quality plastic granulate. A high-quality, sustainable profile part can thus be formed.

It is possible for at least one of the layers of the inner profile to have a fiber-reinforced plastic, preferably on a thermoplastic base. In this case, short fibers are preferably used as reinforcing fibers for the inner profile, wherein these are easily extruded in a simple and cost-effective manner in a suitable matrix material in order to produce the inner profile. The short fibers are preferably selected from a group consisting of plastic fibers, glass fibers, ceramic fibers, metal fibers, natural fibers, and other suitable fibers. In particular, it is possible for aramid fibers or basalt fibers to be used as short fibers.

An exemplary embodiment of the profile part is preferred which is characterized by the fact that at least two layers of the inner profile have materials which are different from one another or consist of materials which are different from one another. The different layers can then easily assume different tasks or functions in the profile part such that it can be adapted to specific requirements in a particularly flexible and favorable manner. In particular, the inner profile preferably has a first layer which comprises a first material or consists of a first material, wherein it has a second layer which has a second material or consists of a second material. Here, the first material is different from the second material. In particular, it is possible for the at least two layers to have or consist of different plastics, in particular different thermoplastic materials. It is also possible for the two layers to have or consist of different fiber-reinforced plastics. The different fiber-reinforced plastics may differ with regard to the matrix material used and/or with regard to the reinforcing fibers used.

An exemplary embodiment of the profile part is also preferred which is characterized by the fact that the reinforcing layer is applied to the inner profile by applying a continuous fiber material. In this way, the profile part can be produced particularly simply, with high quality, and in particular in an integrated production method. A continuous fiber material in this case refers to a material in which the length of the fibers is many times greater than its diameter, wherein the fibers can be processed in a continuous process, in particular by braiding, winding, working, knitting, laying, weaving or in any other suitable manner. In this respect, continuous fibers differ from short fibers because the latter only have a length in which corresponding processing is not possible. In fact, short fibers are typically processed in an extrusion or injection molding process. On the other hand, continuous fibers are typically unwound from a supply roll, which is not possible in the case of short fibers because of the short length.

The continuous fiber material preferably has so-called hybrid fiber rovings, therefore fiber bundles, which have reinforcing fibers and matrix material. It is possible for such a hybrid fiber roving to have reinforcing fibers on the one hand and fibers made from matrix material on the other hand, for example thermoplastic fibers. The reinforcing fibers and the matrix fibers can be arranged one next to the other in the roving. Alternatively or additionally, it is possible for the reinforcing fibers of a hybrid fiber roving to be coated with a matrix material, in particular a thermoplastic matrix material. It is possible that the entire matrix material of the hybrid fiber roving is applied as a coating to the reinforcing fibers such that no additional matrix fibers are present, but it is also possible for the matrix material to be present in a hybrid fiber roving both in the form of a coating on reinforcing fibers and in the form of separate matrix fibers, therefore thermoplastic fibers.

In the production process of the profile part, in particular in a consolidation and/or pultrusion step, the thermoplastic fiber parts of the hybrid fiber roving melt and are introduced directly into the resulting profile part as a matrix material.

A certain proportion of the matrix material which the finished profile part has is preferably applied by the hybrid fiber rovings of the reinforcing layer, wherein another part of the matrix material is applied by the inner profile, in particular by an outer layer of the inner profile which is directly in contact with the reinforcing layer. It is possible to adjust these different proportions in a targeted manner to achieve the desired properties of the profile part. Moreover, when both the reinforcing layer and the inner profile contribute to the total amount of the matrix material of the profile part, it is possible to reduce the proportion of matrix material in the hybrid fiber rovings of the continuous fiber material and/or in the outer layer of the inner profile.

The reinforcing layer is preferably applied to the inner profile, wherein the continuous fiber material is braided onto the inner profile. This is particularly preferably carried out in a braided pultrusion process.

Alternatively or additionally, it is possible for the continuous fiber material to be wound, worked, laid, woven, knitted or applied in another suitable manner to the inner profile.

An exemplary embodiment of the profile part is also preferred which is characterized by the fact that it is produced by joint internal high-pressure forming of the inner profile with the reinforcing layer. Thus, the inner profile and the reinforcing layer are formed together with internal high-pressure. In this way, profile parts suitable for various types of applications can be produced very flexibly. The internal profile is suitable for internal high-pressure forming since, due to its multi-layered construction, it can be formed to be stable enough to absorb the temperature occurring during internal high-pressure forming and the internal pressure without damage. Necessary gas impermeability for the inner profile can also be easily ensured.

An exemplary embodiment of the profile part is also preferred which is characterized by the fact that connecting elements made of plastic, in particular of a thermoplastic material, are injection moulded onto the profile part. These connecting elements are preferably used for connecting to adjacent components, for example in body construction for a vehicle. It is possible that connecting elements made from a fiber-reinforced plastic, in particular a short-fiber-reinforced plastic, are injection molded onto the profile part.

An exemplary embodiment of the profile part is also preferred which is characterized by the fact that the inner profile has an outer layer which comprises a matrix material for a fiber-reinforced plastic or which consists of a matrix material for a fiber-reinforced plastic. It is possible for the outer layer to additionally have reinforcing fibers, in particular short fibers. If the outer layer of the inner profile has a matrix material which is suitable for use in a fiber-reinforced plastic, it can be connected to the reinforcing layer in a particularly favorable manner, whereby a stable and very high-quality profile part can be created. An exemplary embodiment of the profile part in which the outer layer has the same material or consists of the same material which the reinforcing layer has as a matrix material is particularly preferred. In this case, a particularly close, integral connection is formed between the reinforcing layer and the outer layer of the inner profile, wherein it is possible in particular that a defined boundary no longer exists between these layers in the finished profile part such that they pass continuously into one another.

An exemplary embodiment of the profile part in which the outer layer of the inner profile has a thermoplastic or consists of a thermoplastic is particularly preferred. A thermoplastic is preferably used for the matrix material of the reinforcing layer and for the outer layer of the inner profile. The outer layer preferably has a material which is selected from a group consisting of polyamide, referred to as PA for short, and polyphthalamide, referred to as PPA for short. It is possible that the outer layer is made from one of these materials. Furthermore, it is possible that one of these materials is also used as a matrix material for the reinforcing layer.

An exemplary embodiment of the profile part is also preferred which is characterized by the fact that the inner profile has an inner layer and/or an intermediate layer which is/are formed as a support layer. In particular, this layer assumes the function of providing the profile part with increased strength and rigidity. The support layer preferably has a higher rigidity and/or strength than the outer layer of the inner profile.

Preferably, the inner layer and/or the intermediate layer has/have a thermoplastic or consists/consist of a thermoplastic. In particular, it is possible for the material to be selected from a group consisting of polyamide 6, referred to as PA 6 for short, polyamide 6.6, referred to as PA 6.6 for short, radiation-crosslinked PA, PPA, polyetheretherketone, referred to as PEEK for short, liquid crystal polymer, referred to as LCP for short, polyetherimide, referred to as PEI for short, polyphenylene sulphide, referred to as PPS for short, polysulfone, referred to as PSU for short, polyamide 12, referred to as PA 12 for short, polyimide and polyoxymethylene, referred to as POM for short. It is emphasized that PA 6.6 has better mechanical properties, lower moisture absorption, better chemical and media resistance and a higher melting point compared to PA 6.

It is also possible that the material for the inner layer and/or the intermediate layer is foamed. This improves the thermal insulation properties of the profile part as well as its friction properties and reduces its specific weight. In particular, POM provides the internal profile with particularly good sliding properties.

Also preferred is an exemplary embodiment of the profile part in which the inner layer and/or the intermediate layer has/have a material which is suitable for the internal high-pressure forming of the profile part, wherein the inner layer and/or the intermediate layer preferably consists/consist of such a material. The material must be capable of withstanding pressures of up to approximately 600 bar and a temperature of approximately 150° C. to approximately 210° C. without damage and without relevant changes to the material properties. Furthermore, the material must also be gas-impermeable under these conditions.

An exemplary embodiment of the profile part is also preferred which is characterized by the fact that the inner profile has an inner layer which has a gas-impermeable plastic, wherein the inner layer preferably consists of a gas-impermeable plastic. It is possible that this is a fiber-reinforced plastic, in particular a plastic which comprises a matrix material offset with short fibers.

Particularly preferably, the inner layer has or consists of a plastic which is suitable for internal high-pressure forming. The plastic must be able to withstand the above-mentioned conditions, i.e., an internal pressure of up to approximately 600 bar and a temperature of approximately 150° C. to approximately 210° C. without damage and without relevant changes to the material properties.

The inner layer preferably has a thermoplastic or consists of a thermoplastic. Particularly preferably, the inner layer has or consists of a material which is selected from a group consisting of PA6.6, radiation-crosslinked PA, liquid crystal polymer (LCP), polyetherimide (PEI), polyphenylene sulphide (PPS), polysulfone (PSU), PA 12, polyimide, PPA, PEEK, and POM. The material of the inner layer is preferably foamed. Furthermore, it is preferable that the material of the inner layer has favorable sliding properties. This is particularly the case when the inner layer has POM or consists of POM.

Liquid crystal polymer, also referred to as LCP, refers to polymers which show liquid crystalline properties in the melt (thermotropic) or dissolved (lyotropic) and thus a certain degree of order. Mesogens are typically present in the polymer for this purpose. These can be located both in the main chain and in side chains.

Overall, it is found that the intermediate layer and/or the inner layer preferably has/have, preferably consists/consist of, a higher-quality plastic, in particular a plastic with better mechanical properties, a higher melting point, a higher glass transition temperature and better chemical and media resistance than the outer layer. As a result, the intermediate layer and/or the inner layer is/are particularly suitable for acting as a support layer, especially in the case of internal high-pressure forming and/or during injection molding of connecting elements or during extrusion coating of the profile part with plastic.

The intermediate layer and/or the inner layer preferably has/have a plastic which has a glass transition temperature of at least 125° C. Particularly preferably, the inner layer and/or the intermediate layer consists/consist of such a plastic.

Particular preference is also given to a profile part in which the inner profile has an outer layer, as seen in the radial direction, an inner layer, as well as an intermediate layer which is arranged, as seen in the radial direction, between the outer layer and the inner layer. All layers, i.e., the outer layer, the intermediate layer and the inner layer, preferably consist of a thermoplastic or have a thermoplastic. It is possible that at least one of the layers has a fiber-reinforced plastic, in particular with short fibers. The layers preferably differ with respect to the materials used. It is thereby possible that at least two of the layers differ from one another with respect to the reinforcing fibers used and/or the plastic used, in particular the matrix plastic used. In this way, a highly specific profile part which is tailored to specific requirements can be provided, in which in particular the different layers of the inner profile are tailored to different functions or tasks.

The object is in particular also solved by creating a method for producing a profile part with the following steps, wherein the method is in particular suitable for the production of a profile part according to one of the previously described exemplary embodiments: an inner profile having at least two layers is extruded. A reinforcing layer made from fiber-reinforced plastic is applied to the inner profile. The reinforcing layer is consolidated on the inner profile. In terms of the production method, the advantages which have already been explained in connection with the profile part result from this. In particular, the method can be implemented as an integrated process, wherein errors due to air pockets are avoided and the quality of the profile part is increased.

The inner profile supports the reinforcing layer and preferably determines its cross section. In addition, it contributes to providing the matrix material for the profile part.

In one embodiment of the method, it is possible to produce different cross sections for the inner profile during extrusion and/or during a subsequent pultrusion step. In this case, the cross sections already described in connection with the profile part can be generated in the course of the method. In particular, it is possible in a pultrusion step to provide the entire profile part with a corresponding cross section.

The inner profile is preferably extruded by means of a multi-component extruder. In this way, it is possible to produce a multi-layered inner profile in a simple manner and with little effort, wherein the different layers can be tailored to predetermined specific functions.

One embodiment of the method is preferred which is characterized by the fact that the reinforcing layer is applied to the inner profile by applying a continuous fiber material to the inner profile. Particularly preferably, the continuous fiber material is braided onto the inner profile. Alternatively, it is also possible for the fiber material to be wound, worked, woven, laid, knitted or applied in another suitable manner onto the inner profile.

The continuous fiber material preferably has hybrid fiber rovings, as has already been explained in detail in connection with the profile part.

One embodiment of the method, which is characterized by the fact that the reinforcing layer is applied to the inner profile immediately after extrusion, is also preferred. This means, in particular, that an intermediate step no longer takes place between the extrusion of the inner profile and the application of the reinforcing layer. In fact, an integrated process is realized in which the inner profile is extruded as a continuous profile, wherein the reinforcing layer is applied directly to the inner profile running out of the extruder. The continuous fiber material of the reinforcing layer is particularly preferably braided onto the extruded continuous inner profile, wherein the extruded continuous inner profile is used as a braided core in this respect. The inner profile and the braided fiber material are thus conveyed further together, such that there is preferably no relative movement between the braided fiber material of the reinforcing layer and the inner profile. As a result, frictional forces acting between the fibers and the core during the braiding of the fiber material onto a fixed core are avoided such that the fiber material is preserved, whereby the profile part obtains particularly favorable material properties and in particular a high strength and rigidity.

Following the application of the reinforcing layer to the inner profile, pultrusion is preferably carried out, wherein consolidation of the reinforcing layer is preferably carried out as part of pultrusion. Pultrusion preferably comprises the steps of post forming the profile part, withdrawing this and separating the resulting continuous profile into individual pieces. The continuous profile is thus preferably cut to length at the end of the pultrusion process. Alternatively or additionally, it is possible that a bending step is also carried out, wherein the inner profile is bent together with the applied reinforcing layer.

The reinforcing fibers of the reinforcing layer are preferably impregnated during pultrusion with the same thermoplastic as that which is provided in the reinforcing layer itself as a matrix material, in particular in the form of thermoplastic fibers of a hybrid fiber roving, or in the form of a coating of reinforcing fibers of a hybrid fiber roving. This composite of reinforcing fibers and thermoplastic material is then preferably consolidated.

Particular preference is given in the method to braided pultrusion with an upstream extruder, wherein the inner profile is produced by means of the extruder as a continuous profile, onto which the reinforcing layer is applied immediately afterwards by braiding a continuous fiber material. The continuous profile formed in this way then passes through a pultrusion unit in which post forming, if necessary, but in any case, consolidation of the reinforcing layer, as well as withdrawal and separation of individual parts of the continuous profile take place.

In particular by virtue of the extrusion of the inner profile taking place immediately before braiding and consolidation, errors due to air pockets can be avoided, thus increasing the quality of the profile part.

Finally, one embodiment of the method is preferred which is characterized by the fact that the profile part is subjected to internal high-pressure forming. This is easily possible due to the multi-layered construction of the inner profile.

Alternatively or additionally, the profile part is preferably bent. In this way, various shapes of the profile part can be generated in a manner specific to application.

Alternatively or additionally, the profile part is preferably extrusion coated with a plastic at least in regions. A thermoplastic is preferably selected as the plastic, in particular it is possible for a fiber-reinforced plastic, preferably a short-fiber-reinforced plastic, to be selected. It is possible that the profile part is extrusion coated all over with a plastic. However, connecting elements are particularly preferably injection moulded onto the profile part, in particular connecting elements for connection to adjacent components in the assembly of a vehicle body. It is possible for the profile part to be integrally connected to adjacent components, in particular to panelling parts, which preferably comprise organic sheet or consist of organic sheet, by means of the injection-moulded connecting elements. In this case, it is possible for the profile part to bear the occurring loads of the overall component.

The profile part is preferably formed as a structural component. In particular, it is possible for the profile part to be formed as a support tube for a vehicle, in particular for a motor vehicle and especially for a lorry. Particularly preferably, the profile part is formed as an assembly support or as a support tube for a front-end flap of a lorry.

The description of the profile part on the one hand and the production method on the other hand are complementary to each other. Method steps which have been explained explicitly or implicitly in connection with the profile part are preferably, individually or combined with one another, steps of a preferred embodiment of the production method. Features of the profile part which have been explained explicitly or implicitly in connection with the production method are preferably, individually or combined with one another, features of a preferred embodiment of the profile part. The profile part is preferably characterized by at least one feature which is caused by at least one method step of the production method. The production method is preferably characterized by at least one method step which is caused by at least one feature of the profile part.

The invention is explained in more detail below with reference to the drawings.

BRIEF DESCRIPTION OF THE DRAWINGS

FIG. 1 is a schematic cross-sectional view of an exemplary embodiment of a profile part, and FIG. 2 is a schematic depiction of a preferred embodiment of a production method for the production of the profile part.

DETAILED DESCRIPTION OF THE DRAWINGS

FIG. 1 shows a schematic cross-sectional view of an exemplary embodiment of a profile part 1. The cross-sectional plane is thus a plane to which a longitudinal axis L of the profile part 1 is perpendicular. The profile part 1 has an inner profile 3 which is produced as an extrusion profile. In this case, an extrusion direction of the inner profile preferably extends along the longitudinal axis L. The inner profile 3 and also the entire profile part 1 is preferably produced as a continuous profile, wherein it is preferably separated or cut into individual pieces at the end of the production process.

The profile part 1 also has a reinforcing layer 5 which consists of fiber-reinforced plastic. The reinforcing layer 5 is applied to the inner profile 3.

The inner profile 3 has at least two layers, in the embodiment shown here exactly three layers. In this case, these are an outer layer 7, an intermediate layer 9 and an inner layer 11.

The reinforcing layer 5 has reinforcing fibers 13 which are formed as long fibers. In particular, the reinforcing layer 5 is preferably applied to the inner profile 3 by hybrid fiber rovings comprising reinforcing fibers and a matrix material being applied, in particular braided, to the inner profile 3. For the reinforcing fibers 13, plastic fibers, glass fibers, metal fibers, ceramic fibers, aramid fibers or basalt fibers are possible in particular. It is also possible for the reinforcing layer 5 to have a plurality of different fibers made from different fiber materials. A matrix material is provided either in the form of matrix fibers and/or in the form of a coating of the reinforcing fibers 13 in the hybrid fiber rovings of the continuous fiber material. Suitable matrix materials are, in particular, polyamide or polyphthalamide. PA 6 is preferably used as a matrix material for the reinforcing layer 13.

The outer layer 7 preferably has a matrix material for a fiber-reinforced plastic, particularly preferably the same material which is comprised as a matrix material by the reinforcing layer 13. It is possible that the outer layer 7 is made from this material. Furthermore, it is possible for the outer layer 7 to have a fiber-reinforced plastic or to consist of a fiber-reinforced plastic, wherein short fibers are used as reinforcing fibers in particular. A thermoplastic, preferably polyamide or polyphthalamide, in particular PA 6, is possible as a material for the outer layer 7.

The intermediate layer 9 preferably has more rigid and/or stronger material properties than the outer layer 7. It is preferably formed as a support layer which serves in particular to absorb and support mechanical forces introduced into the profile part 1, either by forces caused by internal pressure during internal high-pressure forming, pressure forces acting from the outside during extrusion coating of the profile part 1 with plastic, bending forces during the forming of the profile part 1, or forces introduced into the profile part 1 when this is used. The intermediate layer 9 preferably has or consists of a thermoplastic. In particular, the intermediate layer 9 preferably has a material or consists of a material which is selected from a group consisting of polyamide 6.6, polyphthalamide, liquid crystal polymer (LCP), polyetherimide (PEI), polyphenylene sulphide (PPS), polysulfone (PSU) PA 12, polyimide, polyetheretherketone, polyoxymethylene and radiation-crosslinked polyamide. It is possible that the material of the intermediate layer 9 is foamed.

The inner layer 11 preferably has a gas-impermeable plastic or consists of a gas-impermeable plastic. In this way, the profile part can be formed as a whole simply and securely by internal high-pressure forming without fear of the profile part 1 bursting or cracking. The inner layer 11 preferably has or consists of a thermoplastic. Preferably, the inner layer 11 has or consists of a material which is selected from a group consisting of polyamide 6.6, polyphthalamide, liquid crystal polymer (LCP), polyetherimide (PEI), polyphenylene sulphide (PPS), polysulfone (PSU), PA 12, polyimide, polyetheretherketone, polyoxymethylene and radiation-crosslinked polyamide. It is possible that the material of the inner layer 11 is foamed.

The material of the intermediate layer 9 and/or of the inner layer 11 can comprise fiber-reinforced plastic or consist of fiber-reinforced plastic. In this case, short fibers are used in particular as reinforcing fibers.

Therefore, only the reinforcing layer 5 preferably has long fibers which are preferably braided. On the other hand, the outer layer 7, the intermediate layer 9 and the inner layer 11 have short fibers as reinforcing fibers when they have fiber-reinforced plastic.

When the reinforcing layer 5 is consolidated, it is preferably connected integrally to the outer layer 7, wherein a layer boundary 15 passes between the two layers 5, 7 and particularly preferably is no longer present. It is shown schematically in FIG. 1. In particular, however, if the material of the outer layer 7 is different from the matrix material of the reinforcing layer 5, the layer boundary 15 can also remain more or less defined during consolidation of the reinforcing layer 5.

FIG. 2 shows a schematic depiction of an embodiment of a method for the production of the profile part 1. A braided pultrusion device 17 is used for producing the profile part 1. This has a multi-component extruder 19, by means of which the inner profile 3 is continuously produced as a continuous profile. As seen along the extrusion direction, a braiding unit 21 is arranged downstream of the multi-component extruder 19, through which the inner profile 3 is guided as a braided core. On this braided core, therefore on the inner profile 3, the continuous fiber material for the reinforcing layer 5 is braided by the braiding unit 21. Several braiding wheels 25 are provided for this purpose. A pultrusion unit 27 is arranged downstream of the braiding unit 21, as seen in the feed direction of the inner profile 3. In this, the reinforcing layer 5 is consolidated on the inner profile 3. In an inherently known manner, the pultrusion unit 27 also serves to post-form the profile part 1, by the profile part 1 preferably being pressed through an input matrix of the pultrusion unit. Bending of the profile part 1 in the pultrusion unit 27 is also possible.

The pultrusion unit 27 also has a withdrawing device 29 for withdrawing the profile part 1, which is initially formed as a continuous profile. The multi-component extruder 19 also preferably has a separate withdrawing device 31, wherein in this case the withdrawal forces can be distributed more homogeneously over the entire length of the resulting continuous profile.

As seen in the feed direction of the continuous profile, a separating device 33 is preferably arranged behind the withdrawal device 29, by means of which the continuous profile can be separated or cut into separate profile parts 1.

FIG. 2 shows that the profile part 1 is preferably produced in an integrated process, wherein the application of the reinforcing layer 5 in the braiding unit 21 takes place immediately after the extrusion of the inner profile 3, such that the reinforcing layer 5 is applied directly to the extruded continuous inner profile 3. The pultrusion and consolidation of the reinforcing layer 5 takes place directly afterwards, as well as the separation into individual profile parts 1.

The resulting profile parts 1 are preferably subjected to an internal high-pressure forming method in order to give them a desired shape. Alternatively or additionally, it is possible for the profiled parts 1 to be extrusion coated at least in regions with a plastic, in particular a fiber-reinforced plastic and very particularly preferably a short-fiber-reinforced plastic. In this case, connecting elements are particularly preferably injection molded onto the profile parts 1, which ultimately serve for the connection to adjacent components of an assembly, for which the profile parts 1 are used. In this case, this is particularly preferably panelling parts of a vehicle body, in particular of a motor vehicle, preferably of a lorry.

Through the specific selection of the plastics used, the profile part 1 can in particular also be formed to be chemical-resistant. In addition, the plastics used can preferably be used in a wide temperature range, in particular from −40° C. to 90° C. In this way, increased performance values for the profile part 1 are possible, with simultaneous weight and cost savings due to the multi-material mix used. In this case, it is easily possible to introduce materials with liquid or gas-impermeable, chemical-resistant and friction-reducing properties through the selection of the different layers.

By virtue of the fact that the inner profile 3, which is used as a braided core, moves with the continuous fibers to be applied in the braiding unit 21, the withdrawal forces, which the withdrawal device 29 must apply, also decrease. There is also a significantly lower probability of fiber tears than in the event of application to a fixed braided core.

Overall, an ideally torsion and bend-resistant, closed hollow profile is able to be produced as a profile part 1 by means of the method. The method represents a highly integrated production process which is suitable for series production. The profile part 1 has a recyclable material concept, wherein the profile part 1 can be used in particular as a technically usable, reinforced plastic granulate in the course of recycling. The integration of all production processes for the profile part 1 results in a considerable cost and energy savings. The performance capabilities of the profile part 1 can be increased by integrating different materials and, in particular, by the multi-layered inner profile 3, wherein the profile part 1 can be tailor-made to the requirements in particular. In particular, this can be provided with increased strength and rigidity. Gas-impermeable properties are possible, in addition the profile part 1 can be resistant to media and temperature and can have particularly favorable sliding properties. Finally, it is also possible to improve the NVH behavior (noise, vibration, harshness) of the profile part 1.

The invention claimed is:

1. A method for producing a rigid profile part, comprising the steps of:
   extruding an inner profile;
   applying a reinforcing layer made from fiber-reinforced plastic to the extruded inner profile; and
   producing the rigid profile part by joint internal high-pressure forming of the reinforcing layer with the extruded inner profile;
   wherein the extruded inner profile has an outer layer with a same matrix material as the reinforcing layer, an inner layer which is a support layer, and an intermediate layer disposed between the outer layer and the inner layer which is a support layer;
   wherein the outer layer is disposed adjacent to the reinforcing layer and wherein the outer layer is made from fiber-reinforced plastic.

2. The method according to claim 1, wherein the inner layer has a gas-impermeable plastic.

3. The method according to claim 1, wherein the inner layer is made from a gas-impermeable plastic.

4. The method according to claim 1, wherein the reinforcing layer is applied to the extruded inner profile by applying an endless fiber material to the extruded inner profile.

5. The method according to claim 1, wherein the reinforcing layer is applied to the extruded inner profile immediately after the extruding.

* * * * *